//]: #

United States Patent [19]
Deyerl et al.

[11] 3,780,235
[45] Dec. 18, 1973

[54] ROADBED APPARATUS FOR MODEL VEHICLES

[76] Inventors: Herman F. Deyerl, P.O. Box 3721, Santa Monica, Calif.; Robert J. Reynolds, 1543 Pine Valley, Ann Arbor, Mich.

[22] Filed: July 11, 1972

[21] Appl. No.: 270,654

[52] U.S. Cl................ 191/13, 46/243 LV, 238/10, 191/22 C
[51] Int. Cl................................................ B60l 1/00
[58] Field of Search .......... 46/202, 243 LV, 244 R; 238/10; 191/13, 22 C

[56] References Cited
UNITED STATES PATENTS
3,339,307  9/1967  Floyd et al............................ 46/244
2,616,630  11/1952  De Michele ...................... 238/10 A Primary Examiner—Louis G. Mancene
Assistant Examiner—Robert F. Cutting
Attorney—Olsen and Stephenson

[57] ABSTRACT

Apparatus that provides a roadbed for electrically powered model vehicles wherein the running surface of the roadbed comprises conducting elements for transmitting electrical signals to the vehicles for steering and speed control. The roadbed is constructed and arranged in more than one modification each of which facilitates packaging and storage of the game set. Accessories are also provided for mounting on the roadbed.

9 Claims, 9 Drawing Figures

PATENTED DEC 18 1973 3,780,235

ROADBED APPARATUS FOR MODEL VEHICLES

REFERENCE TO RELATED APPLICATION

This application relates to the disclosure in pending U.S. application Ser. No. 184,105, filed Sept. 27, 1971, entitled "System for Operating Electrically Powered Vehicles on a Roadbed."

BACKGROUND OF THE INVENTION

The present invention relates to improvements in roadbeds for electrically powered model vehicles, and especially to roadbeds which have for the upper surface thereof, two mutually insulated conductors on which the vehicles travel and from which they receive from a remote source signals for control of their velocity and steering.

In roadbeds of the foregoing character, problems have existed in packaging, shipping, and storage of the roadbeds. When used with small model vehicles, it is desired that the roadbed be easily packaged in small containers and that the user be in a position to lay the roadbed quickly and easily, and thereafter, that he be able to disassemble the roadbed quickly and restore the roadbed to its shipping container or storage space. In roadbeds of this character problems also have existed in mounting accessories on the roadbed surface so that they are free of electrical problems and so that they will remain in a desired position on the roadbed and surface.

SUMMARY OF THE INVENTION

The present invention has overcome the deficiencies in the prior art and provides a roadbed which can be easily collapsed into a small package and which is light in weight and sturdy in construction, and which also has accessories that may readily be used, if desired.

According to a preferred form of the present invention, a roadbed is provided for conduction of electric currents to model vehicles moving on the upper surface of the roadbed comprising a nonconductive base sheet, and conductors secured to the base sheet to define the upper surface of the roadbed on which the model vehicles are adapted to travel. The conductors are arranged to provide two mutually insulated sets of conductors, each set having an individual bus conductor affixed along a boundary of the base sheet. One bus conductor is integrally connected with the other set of conductors. In this form of the invention, the roadbed has a plurality of rigid sections or panels which are hingedly connected together by a flexible sheet of nonconductive material bonded to the undersurface of the base sheet. In this position the adjacent bus conductors at each hinge are electrically connected by flexible conductors sandwiched between the flexible sheet of nonconductive material and the base sheet.

In another form of the invention, the nonconductive base sheet and the conductors secured thereto are flexible so that the roadbed can be rolled into a cylinder. The base sheet and the conductors are a laminate of about 10 mils thickness. It is also contemplated that this form of the invention may use a low-density compressible material bonded to the bottom surface of the laminate to accommodate small irregularities that may exist on the supporting surfaces of the roadbed, and to facilitate the flattening of the laminate after the roadbed has been unrolled. In the second form of the invention, the roadbed, when rolled into a cylinder may serve as a container or part of a container for the complete model vehicle game set.

Game sets such as this may include not only the vehicles but also accessories that may be mounted on the upper surface of the roadbeds. Preferred forms of such accessories include devices having suction cups of dielectric material that can be supported on the conductive surface in a fixed position and also magnetic devices for supporting the accessory on the roadbed surface.

Thus, the objects of the present invention include providing an improved roadbed for model vehicles which is a simple, low-cost construction that is light in weight and is readily foldable or rolled into a small package for shipping and storage purposes; and providing improved means for mounting accessories on the roadbed.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENTS

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed hereis is for the purpose of description and not of limitation.

Figure 2:
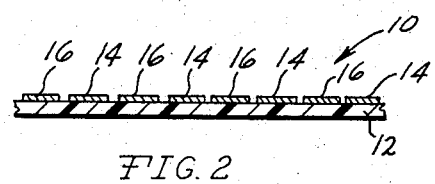
FIG. 2 is a fragmentary section taken lengthwise through the embodiment of FIG. 1.
Figure 1:
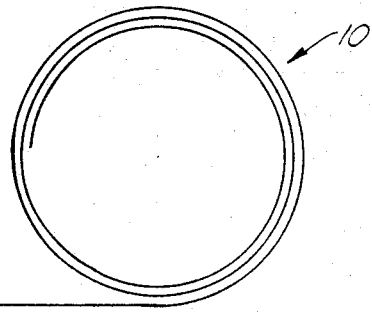
FIG. 1 is a side elevational view of one embodiment of the roadbed rolled into a cylinder.

Referring now to the drawing, the embodiment of the invention illustrated in FIGS. 1 and 2 will be described first. The roadbed 10 comprises a nonconductive base sheet 12 and conductors 14 and 16 secured to the base sheet 12 to define the upper surface of the roadbed on which model vehicles are adapted to travel. The conducting segments 14 and 16 are arranged to provide currents of alternate opposite polarity as is more specifically described in the aforesaid U.S. Pat. application, Ser. No. 184,105. An especially suitable construction is one incorporating a thin laminate of nonconductive plastic and conductive foil. It is also contemplated that a backing of foam rubber or equivalent low-density compressible material may be bonded to the under surface of the base sheet 12 to accommodate irregular surfaces on which the roadbed may be placed, and to facilitate the flattening of the laminate after the roadbed has been unrolled. The backing sheet may have a thickness of one-eighth inch to one-fourth inch.

The roadbed 10 has the advantage that it has relatively low weight which is of importance in handling and shipping, and the roadbed can easily be rolled up because of its flexibility which also permits it readily to be unrolled and flattened. The roadbed 10 can be folded to a small degree between adjacent conductor segments 14 and 16, and where the foil that is used is quite thin, the conductors themselves will flex to facilitate rolling the unit into the shape shown in FIG. 1. When in this shape the roadbed can serve as a storage container or as part of the storage container in which the model vehicles, accessories and the like can be housed.

Figure 5:
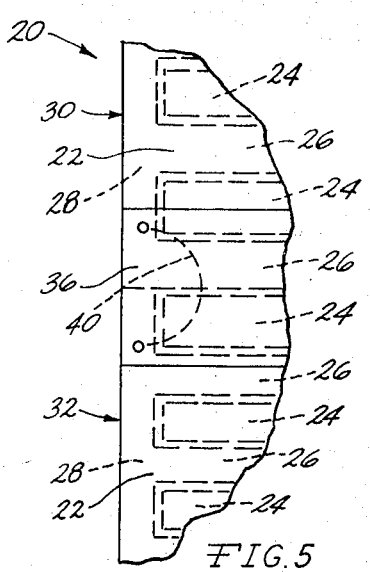
FIG. 5 is an enlarged fragmentary bottom plan view showing a portion of one of the hinge connections between two of the embodiment of FIG. 3.

Attention is next directed to FIGS. 3, 4 and 5 which disclose a modified form of the invention and with respect to which a more detailed explanation of the conducting surface will be made. The roadbed 20 is also adapted for conduction of electric currents to motor vehicles moving on the upper surface thereof, and it comprises a nonconductive base sheet 22 and conductors 24 and 26 secured to the base sheet 22 to define the upper surface of the roadbed on which the model vehicles are adapted to travel. The conductors are arranged to provide two mutually insulated sets of conductors, each set having an individual bus conductor affixed along a boundary of the base sheet. Thus, the conductor 26 includes the bus conductor 28 along the left boundary of the base sheet 22, as can be seen in FIG. 5. The opposite boundary of the sheet, which is not shown in FIG. 5, will contain the bus conductor associated with the conductor 24.

Figure 3:
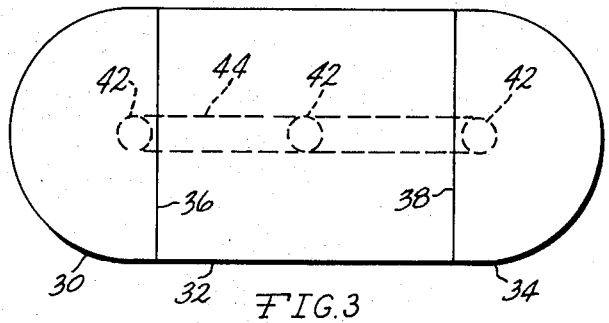
FIG. 3 is a bottom plan view of another embodiment of the roadbed in its unfolded state and having accessories positioned thereon.
Figure 4:
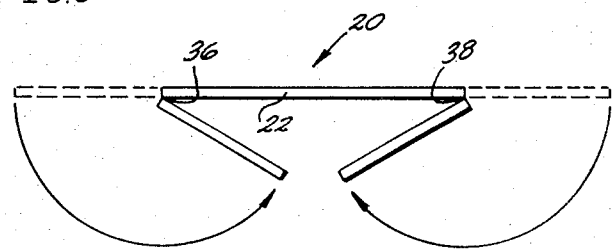
FIG. 4 is a side elevational view of the embodiment of FIG. 3, showing the manner of folding the embodiment into a small package.

In the embodiment of the invention shown in FIGS. 3-5, the nonconductive base sheet is in the form of a plurality of rigid panels 30, 32 and 34 which are hingedly connected together at 36 and 38. The hinge connection is provided by a flexible dielectric sheet of material which is bonded to the base sheets 22 of the adjacent panels 30 and 32. To provide a suitable continuous electric bus conductor, a flexible conductor 40 is connected to the adjacent ends of the bus conductor 28. Thus, the roadbed 20 can be folded into a relatively small package as is shown in FIG. 4 for shipment and storage purposes. In this form of the invention, the folding will occur between two adjacent segments of the conducting surface.

The operation of model vehicles on the surface will not be described. For a full disclosure of the mode of operation of one or more model vehicles on the surface, reference is made to the aforesaid pending U.S. Pat. application, Ser. No. 184,105.

It is desirable to be able to mount accessories on the surface of the roadbed. For example, pylons around which the model vehicles are adapted to travel may be desired, such as are shown in FIG. 3 at the reference numeral 42. When so mounted, a suitable band 44 may be positioned around the pylons 42 to provide a central barrier.

Figure 6:
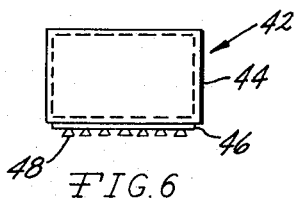
FIG. 6 is a side elevational view of one embodiment of an accessory that can be mounted on the roadbed.
Figure 7:
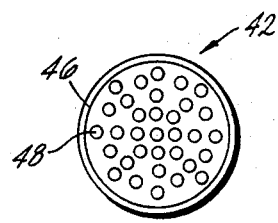
FIG. 7 is a bottom plan view of the embodiment shown in FIG. 6.

As best seen in FIGS. 6 and 7, each of the accessories 42 is in the form of a hollow cylinder 44 which has a disk 46 bonded to its lower surface. The disk is made of rubber or other equivalent dielectric material, and it includes a plurality of suction cups 48 which are integrally molded with the disk 46 and which are operable to engage firmly the upper surface of certain of the conductors 24 and 26, or in the embodiment of FIGS. 1 and 2, the conductors 14 and 16.

Figure 8:
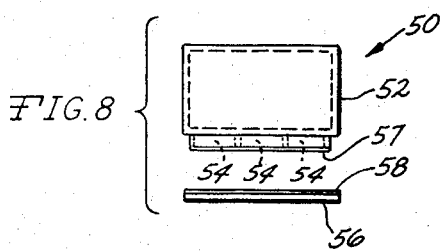
FIG. 8 is a side elevational view of a modified form of a two-piece accessory for mounting on the roadbed.
Figure 9:
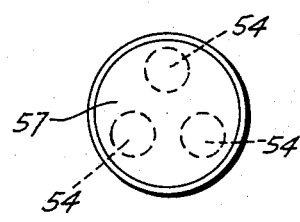
FIG. 9 is a bottom plan view of the upper piece of the embodiment of FIG. 8.

An alternate fastening accessory 50 is shown in FIGS. 7 and 8. This embodiment also includes a hollow cylinder 52 on the base of which are secured three relatively strong magnets 54. On the lower surfaces of the magnets 54 is bonded a material which exhibits an appreciable frictional effect, such as rubber, whose surface may additionally have been processed to yield maximum friction. A thin disk of ferrous metal 56 is also provided, and it has on its upper surface a thin adhesive film 58. By means of the adhesive film 58, the disk 56 can be mounted to the bottom side of the roadbed in any desired location. Once the disk has been installed, the cylinder 52 can be placed above the disk on the top side of the roadbed. The magnetic force between the magnets 54 and the disk 56, acting through the relatively thin roadbed base, will press the cylinder 52 to the roadbed. The material 57 will tend to prevent sideways motion or slippage of the cylinder 52 because of the frictional resistance between it and the roadbed surface.

It is claimed:

1. A roadbed for conduction of electric currents to model vehicles moving on the upper surface of the roadbed comprising a nonconductive base sheet, and conductors secured to said base sheet to define the upper surface of the roadbed on which the model vehicles are adapted to travel, said conductors being arranged to provide conducting segments of alternate opposite polarity, said base sheet being foldable between at least one pair of adjacent conducting segments for packaging and storing the roadbed.

2. The roadbed that is defined in claim 1, wherein said nonconductive base sheet comprises a continuous flexible sheet which can be rolled into a cylinder by limited folding between each pair of adjacent conducting segments.

3. The roadbed that is defined in claim 1, wherein said nonconductive base sheet comprises at least two relatively rigid panels hingedly connected together and said base sheet is foldable 180° at each hinged connection.

4. The roadbed that is defined in claim 1, including in combination therewith accessories mounted on the upper surface of the roadbed, each accessory having retention means for adhering to said roadbed.

5. The combination that is defined in claim 4, wherein said retention means comprises a base of resilient dielectric material having a plurality of suction cups on its bottom surface releasably attached to the upper surface of said roadbed.

6. The combination that is defined in claim 4, wherein said retention means comprises a base containing at least one magnet, the bottom of which is surfaced with a material that provides a frictional effect for engagement with the upper surface of said roadbed, and a disk of ferrous material bonded to the lower surface of the roadbed below said magnet so that the magnetic force between the magnet and the disk will retain the accessory in place on the upper surface of the roadbed.

7. A roadbed for conduction of electric currents to model vehicles moving on the upper surface of the roadbed comprising a nonconductive base sheet, and conductors secured to said base sheet to define the upper surface of the roadbed on which the model vehicles are adapted to travel, said conductors being arranged as two mutually insulated sets, said base sheet and said conductors being a relatively thin flexible laminate of nonconductive plastic and conductive foil, the laminate being sufficiently thin and flexible so that it can be rolled into the shape of a cylinder for storage purposes.

8. The roadbed that is defined in claim 7, wherein a sheet of backing material of low density compressible material is bonded to the bottom surface of said laminate.

9. A roadbed for conduction of electric currents to model vehicles moving on the upper surface of the roadbed comprising a nonconductive base sheet, and conductors secured to said base sheet to define the upper surface of the roadbed on which the model vehicles are adapted to travel, said conductors being arranged to provide two mutually insulated sets of conductors, each set having an individual bus conductor affixed along a boundary of said base sheet, one bus conductor being integrally connected with one set of conductors and the other bus conductor being integrally connected with the other set of conductors, said roadbed being formed in a plurality of relatively rigid sections that are hingedly connected together by a flexible sheet of nonconductive material bonded to the under surface of said base sheet, the adjacent bus conductors at each hinge being electrically connected by a flexible conductor sandwiched between the flexible sheet of nonconductive material and said base sheet.

* * * * *